Jan. 20, 1959 W. J. WILKIE 2,869,426
MASS DEPLOYING APPARATUS
Filed June 10, 1955 3 Sheets-Sheet 2
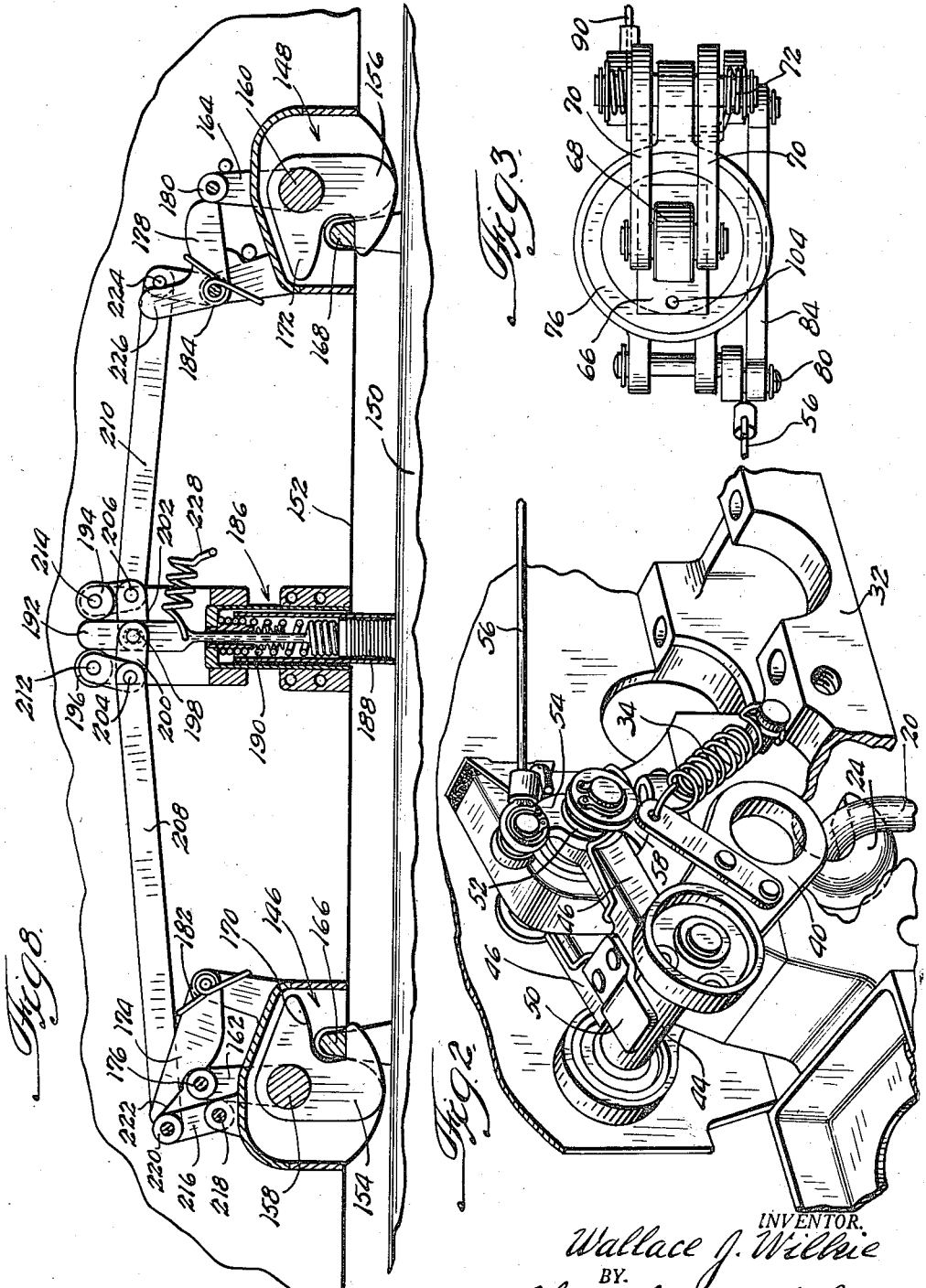
INVENTOR.
Wallace J. Wilkie
BY
Thiess, Olsen, Mecklenburga,
van Holst, & Coltman

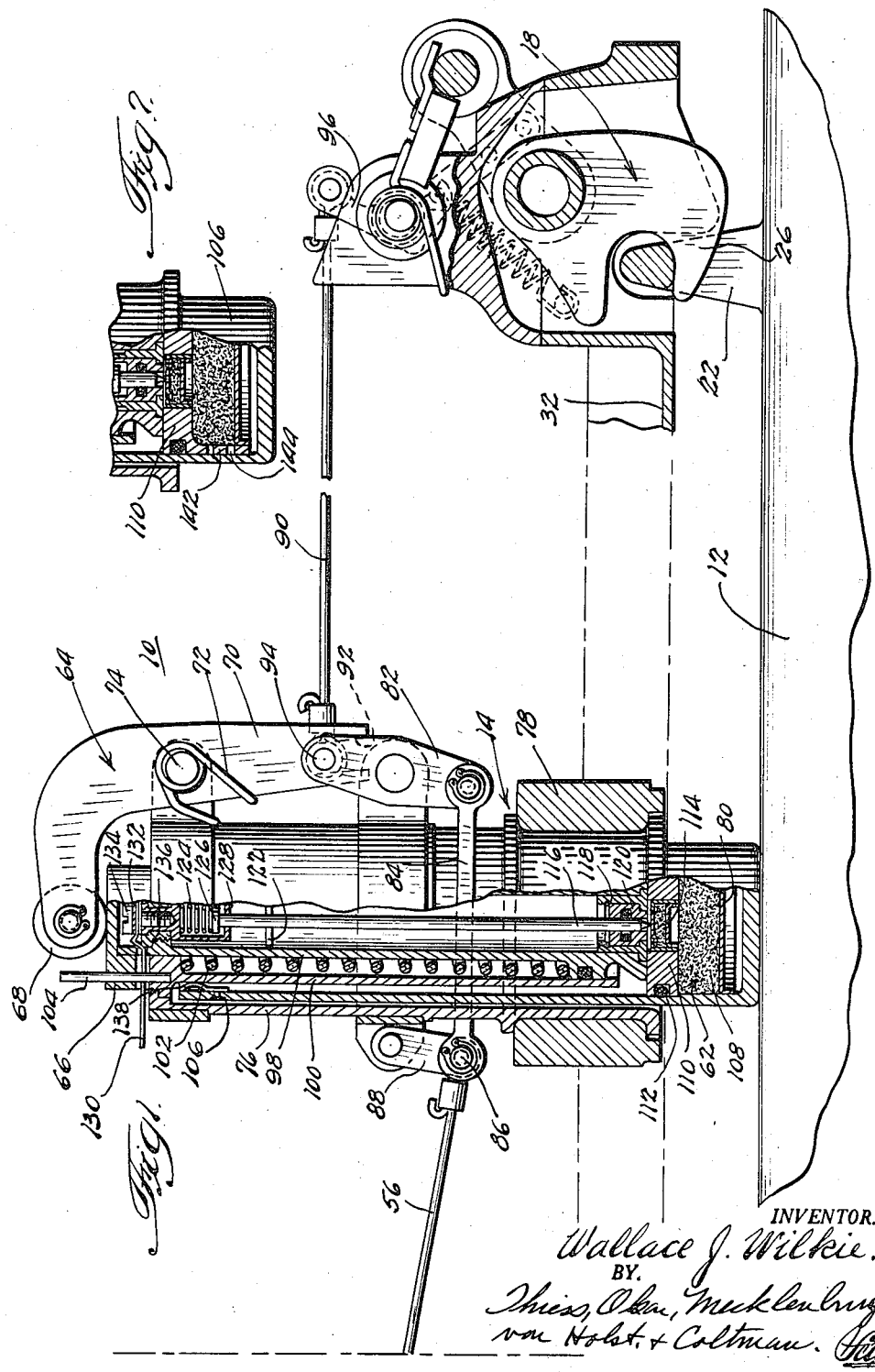

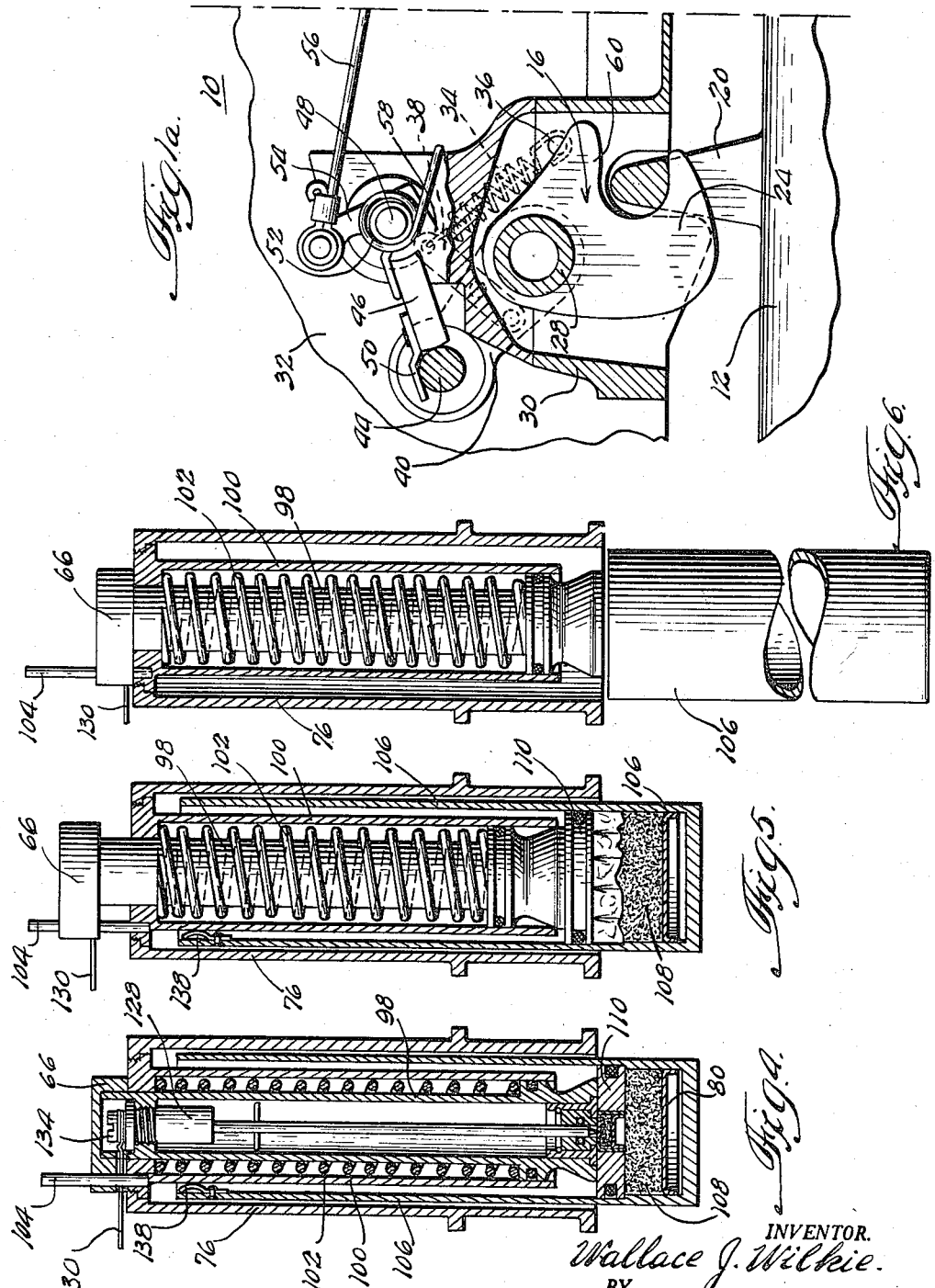

United States Patent Office 2,869,426
Patented Jan. 20, 1959

2,869,426

MASS DEPLOYING APPARATUS

Wallace J. Wilkie, Superior Township, Washtenaw County, Mich., assignor, by mesne assignments, to Avco Manufacturing Corporation, Stratford, Conn., a corporation of Delaware Application June 10, 1955, Serial No. 514,528

11 Claims. (Cl. 89—1.5)

This invention relates to improved mass deploying apparatus, and more particularly to apparatus for deploying ordnance stores from beneath an aircraft.

While this invention is generally applicable to the forceful ejection of a mass from a position adjacent any body, it is especially useful in the discharge of ordnance stores from high speed aircraft. As used in this application, the term "stores" is intended to be construed in its broad sense and includes cameras, parachutes, bombs, rockets, and the like. The instant invention may be applied, for example, to the ejection of a pilot or passenger and associated equipment from a high speed aircraft.

The problem of discharging stores from aircraft in flight has been aggravated by the increasing speed of such aircraft. At speeds in excess of about Mach No. .8, bombs and other missiles will not fall in the normal manner under the influence of gravity, but the influence of the turbulent air stream thereon may be sufficient to cause the missile to be maintained adjacent to the aircraft or to rise relative thereto, thus seriously endangering the aircraft empennage and the like. It has been found, in particular, that upon release of a store carried beneath an aircraft, an extremely large force resulting from the circular air motion about the aircraft surfaces is applied to the tail portion of the store, tending to cause the tail portion to rise substantially and interfere with the aircraft. In large aircraft employing bomb bays, a similar problem is encountered in that it has been found that upon release of stores from their racks in such bomb bays, the stores have tumbled in a random manner within the bomb bay as a result of the turbulent air therein, causing structural damage and obvious danger to the aircraft personnel. It has, therefore, been proposed that some system of forcefully ejecting the store from the area of the aircraft be employed. Such systems heretofore proposed have been extremely costly and have added greatly to the gross weight of the aircraft. As weight is a critical factor in aircraft, such ejection systems have been unsatisfactory. Furthermore, the systems heretofore proposed have failed to positively coordinate the suspension, separation, and ejection of the stores from the aircraft.

It is one important object of this invention to provide an improved system for deploying a mass from a supporting body in which the suspension, separation and ejection of the mass are positively coordinated and controlled.

It is a further object of this invention to provide an improved system for the suspension, separation and ejection of a missile from an aircraft over a wide and increased range of aircraft speeds.

It is another object of this invention to provide an improved system for the suspension and separation of missiles from aircraft, said system having a minimum number of operating parts and being of substantially reduced weight.

It is a further object of this invention to provide an improved missile deploying system having positive action irrespective of the physical conditions under which it is employed.

It is another object of this invention to provide a missile deploying apparatus using an explosive actuating force in which the explosive is substantially isolated from the operating mechanism, preventing fouling of the mechanical parts and substantially reducing maintenance.

It is still a further object of this invention to provide an improved missile deploying apparatus which is easily loaded and adaptable to many aircraft, a variety of stores and other analogous uses.

It is an additional object of this invention to provide improved mass deploying apparatus which is conducive to mass production and assembly and comprises a plurality of interrelated subassemblies.

Further and additional objects of this invention will become manifest from a consideration of this specification, the accompanying drawings and the appended claims.

In one form of this invention a system is provided for the suspension, separation and forceful ejection of an ordnance store from a high speed aircraft employing an explosive ejecting charge and a pair of coordinated supporting hooks. More particularly, a coordinated system is provided in which an explosive charge is contained within a sealed expansible chamber and is adapted to first release a pair of missile supporting hooks and subsequently apply a substantial ejecting force to the missile to insure complete and immediate separation of the missile from the supporting body.

For a more complete understanding of this invention reference will now be made to the accompanying drawings wherein:

Figure 1 is an illustration of portions of one embodiment of this invention, shown partially in section;

Fig. 1a illustrates the remaining portions of the embodiment of Fig. 1, also partially in section;

Fig. 2 is a perspective view of the portion of the embodiment of Figs. 1 and 1a which is illustrated in Fig. 1a;

Fig. 3 is a top plan view of a portion of the embodiment of Fig. 1;

Fig. 4 is a sectional view of the explosive cartridge which forms a part of the embodiment of Fig. 1;

Fig. 5 illustrates the cartridge of Fig. 4, partially actuated;

Fig. 6 illustrates the cartridge of Fig. 4, following actuation thereof;

Fig. 7 is a partial sectional view of an alternate embodiment of the cartridge illustrated in Fig. 4; and Fig. 8 is an alternate embodiment of the mechanical linkages illustrated in Figs. 1 and 1a.

Referring now to the drawings and more particularly to Figs. 1 and 1a, one embodiment 10 of this invention is illustrated for supporting a bomb 12. The apparatus 10 consists of three basic units, an explosive ejector 14, and a pair of hook assemblies 16 and 18 which are controlled thereby. These units may be individually manufactured as interchangeable subassemblies, to be integrated into an operative system in the aircraft. When a bomb 12 has been placed in the mechanism 10 whereby eyelets 20 and 22 are engaged by hooks 24 and 26, the bomb is maintained in this position until the mechanism of this invention is actuated by a remote control device generally contained in the cockpit of the aircraft. Either hook 24 or 26 may be independently operated to engage a bomb eyelet, thus greatly facilitating loading the aircraft.

The hook assemblies 16 and 18 are basically alike and therefore a description of hook assembly 16 will clearly indicate the construction of both. The hook 24 is pivotally mounted about a rotatable shaft 28 which is secured in a hook housing 30 forming a part of the bomb supporting pylon 32 normally suspended beneath an aircraft wing. The hook 24 is normally urged in a clockwise direction to the release position by hook spring 34 which is under tension between a pin 36 mounted in the hook housing 30 and an arm 38 fixed to a rotatable arm 40 integral with the hook 24 and the shaft 28. The rotatable arm 40 is provided with rounded stop surface 44 rotatable about the shaft 28 and about its axis and fixed relative to the hook 24. As is clear from the drawing of Fig. 1a the hook is so shaped that in addition to the force of spring 34 the weight of bomb 12 urges the hook 24 in a clockwise direction.

A sear 46 is rotatably mounted about pin 48 and engageable with stop 44 to prevent clockwise motion of the stop under the combined influence of spring 34 and the weight of bomb 12. A retainer 50 is provided on the sear 46 to engage stop 44 and position sear 46 relative thereto. A coil spring 52 is mounted about pin 48 and urges sear 46 in a counterclockwise direction to urge the retainer 50 against the stop 44. A sear release arm 54 is rotatably mounted about pin 48 and movable through a tie rod 56 which will be described in greater detail below. The sear release 54 has a shoe portion 58 engageable with the sear 46 to force the sear in a clockwise direction against the influence of spring 52 when the tie rod 56 is placed under tension. Thus, tension in the tie rod 56 rotates sear 46 in a clockwise direction permitting stop 44 and consequently hook 24 to rotate in a clockwise direction releasing bomb eyelet 20.

Following such actuation the associated mechanism to be described immediately returns tie rod 56 to its initial position, thus permitting the lower surface of sear 46 to rest against stop 44, while the hook is in the released position. In reloading, a subsequent bomb is placed under the mechanism described and the eyelet 20 forced upwardly against the hook heel 60. An operator will force the bomb upwardly against the heel 60, thus rotating the hook 24 in a counterclockwise direction against the spring 34 whereby the hook engages the eyelet 20 and is locked in position by engagement of the sear 46 and retainer 50 with stop 44.

This entire mechanism is clearly illustrated in perspective in Fig. 2 wherein it can be seen that the tie rod 56 when placed under tension rotates the sear release 54 whereby the sear shoe 58 engages the sear 46 to rotate the same in a clockwise direction against the force of sear spring 52. Thereby the stop 44 is released to rotate in a clockwise direction under the influence of spring 34 to rotate the bomb hook 24 and release the missile 12.

The mechanism for controlling the hooks described above is illustrated in Fig. 1 and comprises an explosive chamber assembly 62 and a release mechanism 64 actuated thereby. When the explosive is ignited the upper cap 66 moves upwardly, in a manner to be described, forcing roller 68 which is in abutment thereagainst to rise, effecting clockwise rotation of bell crank 70. Bell crank 70 is normally urged in a counterclockwise direction by coil spring 72 mounted on bell crank pivot pin 74. Pivot pin 74 is fixed in the ejector housing 76 which is permanently mounted through a retaining ring 78 in the missile pylon 32. Clockwise motion of bell crank 70 is transferred through pivotally mounted transfer arm 82 to a transfer link 84 whereby the tie rod 56 is placed under tension. The pivot pin 86 connecting tie rod 56 to transfer link 84 is connected to the ejector housing 76 through a follower link 88.

A tie rod 90, similar to tie rod 56 already described, is placed under tension directly by the motion of bell crank 70. Bell crank 70 has a slot 92 formed in the free end thereof which is engaged by pin 94 to which both tie rod 90 and transfer arm 82 are connected. Tie rod 90 actuates a sear release 96 in hook mechanism 18 in a manner identical to that already described with respect to hook mechanism 16. The hooks 24 and 26 are in opposed counter rotating relationship whereby the bomb is positively positioned under the pylon in a manner believed clear from the drawings.

The explosive ejector which positively separates the bomb 12 from the pylon 32 and actuates the mechanism described above will now be discussed in detail. The ejector comprises a central plunger 98 axially movable in a sleeve 100 which is positively fixed within the housing 76. The plunger 98 is normally urged downwardly by coil spring 102 whereby the cap 66 engages the upper end of housing 76. A guide pin 104 is mounted in the upper end of the sleeve 100 and passes through an appropriate aperture in cap 66 to guide the cap and plunger along a substantially axial path. An annular cavity is defined between the sleeve 100 and the housing 76 into which a cartridge case 106 extends. The upper end of cartridge case 106 is open and the lower end thereof contains an explosive compound 108 sealed within the confined lower end by a piston 110 and a barrier 80. The piston 110 is provided with an O-ring seal 112 to produce a compressive seal between the piston 110 and the cartridge case 106. A central aperture is provided in the piston 110 which contains a primer 114 of any conventional type. It is preferred that the cartridge 62 be of the electrically ignited type whereby the primer 114 is responsive to electrical impulses. Such electrical impulses are applied to the primer 114 through an igniting rod 116 extending upwardly through the central cavity in plunger 98. The rod 116 is electrically isolated from the other metallic components through insulating spacers 118 and 120 at the lower end thereof and an annular insulating spacer 122 at the upper end thereof. Pin 116 is resiliently maintained in abutting relationship to the primer 114 by coil spring 124. The upper flanged end 126 of pin 116 and coil spring 124 are contained within a conducting housing 128. Housing 128 and consequently pin 116 are electrically connected to an igniting wire 130 through an appropriate lug 132 and terminal screw 134. This electrical unit is threadedly mounted in plunger 98 by insulating threaded spacer 136.

The sequence of operations involved in the action of explosive cartridge 62 will be more clearly understood from a consideration of Figs. 4, 5 and 6. Fig. 4 illustrates the cartridge assembly described above as it is positioned prior to actuation. A plurality of retaining springs 138 are provided in the cartridge case 106 to resiliently maintain the cartridge case in position on the sleeve 100 and also to maintain electrical continuity therebetween for ignition. Fig. 5 illustrates the position of the various parts of the ejector immediately subsequent to ignition of the explosive. The piston 110 has moved upwardly as a result of the explosion of the material 108, thus causing cap 66 to move upwardly partially compressing coil spring 102. As is clear from Figs. 1 and 1a this limited upward movement of cap 66 causes clockwise motion of bell crank 70 tensioning tie rods 56 and 90 to actuate sear releases 54 and 96, thus releasing hooks 24 and 26 and freeing missile 12. Subsequent expansion of the explosive material 108 will cause the cartridge case 106 to move downwardly applying substantial downward force to the bomb 12. This will effect separation of the bomb 12 from the supporting aircraft insuring safe deployment of the missile toward its target. As shown clearly in Fig. 6 the cartridge case 106 will have a driving stroke of several inches after which it is completely free of the remainder of the ejector apparatus and will be removed therefrom by the inertia of the chamber and the stored energy of the coil spring 102.

Upon completion of the stroke of case 106 relative to the piston 110, the piston 110 will be positioned at the upper end of case 106 and will be retained there by the plurality of springs 138 secured in the cartridge case 106. Thus, the exploding gases are confined within the cartridge case and the entire unit is discharged from the aircraft without danger of contaminating the operating mechanism with the explosion products. As already described, the forward motion of plunger 98 is limited by cap 66 and it is thus automatically repositioned for subsequent use. Thus, conditioning the ejector for reuse merely requires the insertion of a new explosive unit 62 in the ejecting mechanism 14.

An alternate embodiment of the described construction is shown in Fig. 7. This device differs from that described only in the provision of a substantial skirt 142 extending downwardly from the piston 110 to insure more accurate alignment and axial movement of the piston within the the cartridge case 106. The skirt 142 is provided with a plurality of apertures 144 which equalize the pressure against the cartridge case 106 and insure better and more uniform axial movement thereof.

An alternate mechanical linkage is illustrated in Fig. 8 which functions generally in the same manner as that already described. Therein a pair of hook mechanisms 146 and 148 are provided in the manner already described to support a missile 150 in spaced relationship to a pylon 152. Hooks 154 and 156 have shafts 158 and 160, and arms 162 and 164, respectively, associated therewith, each hook, shaft, and arm assembly being rotatable as a unit. The placement of a bomb in the normal supported position causes bomb eyelets 166 and 168 to engage hook heels 170 and 172 rotating the hooks to a bomb supporting position. When so rotated, arm 162 is locked in retaining position by engagement of sear 174 with a roller 176 which is mounted on arm 162, said sear and roller forming parts of a latch means for the hook 154. Similarly, a sear 178 engages a roller 180 mounted on arm 164 to independently lock hook 156 in the bomb retaining position and may be considered latch means therefor. Coil springs 182 and 184 are provided to normally urge sears 174 and 178 into the hook locking position. An ejector 186 similar to the explosive ejector already described is mounted in the pylon 152 intermediate the hooks 146 and 148 and serves the dual functions already described above. In this embodiment an expandable bellows 188 contains the explosive charge, and initial expansion of the bellows 188, following ignition of the explosive, compresses coil spring 190, raising the plunger 192. Plunger 192 is guided by a pair of rollers 194 and 196 to insure substantially linear vertical movement. Vertical movement of plunger 192 raises a pin 198 carried thereby, thus effecting pivotal movement of a pair of associated links 200 and 202. Links 200 and 202 are connected through pivot pins 204 and 206 to a pair of pivotally mounted tie rods 208 and 210. As is clear from the drawings, vertical movement of plunger 192 causes pins 204 and 206 to rotate about pivot axes 212 and 214, thus causing tension in tie rods 208 and 210. Tension in tie rod 208 rotates link arm 216 about axis 218, causing roller 220 to engage a cam surface 222 forming a part of sear 174. Engagement of roller 220 with cam surface 222 raises sear 174 against the force of spring 182 and releases latch roller 174 permitting clockwise bomb releasing motion of hook 154. Further movement of arm 216 causes arm 216 to engage roller 176 forcing hook 154 in a clockwise releasing direction.

Similarly, motion of tie rod 210 causes latch release pin 224 to move to the left in Fig. 8, thus engaging arm 226 which forms a part of sear 178, whereby the sear is rotated in a counterclockwise direction against the force of spring 184 to release the roller 180. Thus hook 156 is free to rotate in a counterclockwise direction releasing bomb 150.

The above described mechanical action takes place very rapidly during a short time interval following initiation of the expansion within bellows 188 and thereafter the freely suspended bomb is separated from its support by the further expansion of bellows 188. An electrical ignition system actuated through conductor 228 may be employed in this embodiment, as is believed clear, and the bellows and explosive gases will be discharged from the ejector by the compressive force of spring 190, as already described above with respect to Figs. 1 and 1a. Thus, a system is provided whereby a missile may be positively discharged from a supporting body irrespective of the physical conditions under which the missile and body exist. This is accomplished by the coordination of the release of the suspension means and the operation of apparatus for forcefully removing the missile from the aircraft area.

While particular details of several embodiments have been herein described it is believed clear that various modifications may be incorporated into the basic teaching of this invention without departing from the spirit and scope thereof. For example, while an electrically energized explosive ejector is disclosed herein it is believed manifest that any combination of explosive ejectors, either electrically or mechanically actuated, solenoids, compressed gases, and coil springs might be employed as ejectors. Furthermore, it is contemplated that additional ejecting means might be provided where it is desired to deploy the missile in a particular manner. For example, under particular circumstances, it may be desirable to deploy the missile either tail first or nose first, or at an angle to the axis of the aircraft. Various other mechanical linkages will also be apparent to one skilled in the art whereby the positive coordination of the ejection stroke and mechanical release of the missile may be effected while still maintaining the individual effectiveness and operability of the units.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Apparatus for discharging a mass from a body comprising retaining hook means removably securing said mass adjacent to said body, ejection means abutting said mass and mounted in said body for forcefully ejecting said mass from said adjacent position, said ejection means comprising an extensible unitary cylinder freely supported in said body and defining a sealed chamber and explosive means therein, control means mounted adjacent said ejection means, compression spring means intermediate said body and said cylinder, and linkage means interconnecting said control means and said retaining hook means to release said hook means in response to motion of said control means, the initial motion of said ejection means compressing said spring means and actuating said control means to release said hook means prior to the extension of said ejecting means, said spring means thereafter ejecting said sealed cylinder as a unit from said body.

2. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, means limiting the extension of said other end of the enclosure, spring means in said housing compressed by said initial motion to eject said sealed unitary enclosure following release of said hook means, and latch means maintaining said hook means in the missile retaining position and released by said control means, the initial motion of said extensible enclosure following ignition of said explosive means actuating said control means to operate said latch means and release said hook means.

3. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising lever means actuated by the motion of said other end, latch release means actuated by said lever means, spring means in said housing compressed by said initial motion to eject said sealed unitary enclosure following release of said hook means, and latch means maintaining said hook means in the missile retaining position, said latch means being released by said latch release means in response to initial motion of said extensible enclosure actuating said lever means.

4. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising lever means actuated by the motion of said other end, latch release means actuated by said lever means, spring means in said housing compressed by said initial motion to eject said sealed unitary enclosure following release of said hook means, and latch means maintaining said hook means in the missile retaining position, said latch means being released by said latch release means in response to initial motion of said extensible enclosure actuating said lever means, said latch means and said latch release means being freely movable independently thereafter.

5. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising lever means actuated by the motion of said other end, latch release means actuated by said lever means, spring means in said housing compressed by said initial motion to eject said sealed unitary enclosure following release of said hook means, and latch means maintaining said hook means in the missile retaining position, spring means urging said lever means and latch release means toward a position spaced from said latch means, said latch means being released by said latch release means in response to initial motion of said extensible enclosure actuating said lever means, said latch means and said latch release means being freely movable independently thereafter.

6. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising a bell crank pivotally mounted on said housing having one end thereof normally in engagement with said other end of the enclosure and latch release means operatively connected to the other end of said bell crank, spring means in said housing compressed by said initial motion to eject said sealed unitary enclosure following release of said hook means, and latch means maintaining said hook means in the missile retaining position, said latch means being released by said latch release means in response to initial motion of said extensible enclosure.

7. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising plunger means actuated by the motion of said other end of the extensible enclosure, latch release means and pivotally mounted linkage means interconnecting said plunger means and said latch release means, spring means in said housing compressed by said initial motion to eject said sealed unitary enclosure following release of said hook means, and latch means maintaining said hook means in the missile retaining position, said latch means being released by said latch release means in response to inital motion of said extensible enclosure.

8. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising plunger means actuated by the motion of said other end of the extensible enclosure, latch release means and pivotally mounted linkage means interconnecting said plunger means and said latch release means, guide means for said plunger means to insure substantially axial movement thereof, spring means in said housing compressed by said initial motion to eject said sealed unitary enclosure following release of said hook means, and latch means maintaining said hook means in the missile retaining position, said latch means being released by said latch release means in response to initial motion of said extensible enclosure.

9. Apparatus for discharging an elongate missile from an aircraft comprising spaced retaining hook means releasably securing said missile adjacent to said aircraft, means normally urging said hook means to a release position, ejection means mounted in said aircraft intermediate said hook means for forcefully ejecting said missile from said position adjacent the aircraft, said ejection means comprising an open-ended housing, a longitudinally extensible sealed unitary cylindrical enclosure freely contained within said housing, one end of said enclosure extending through the open end of said housing and abutting said missile, explosive means within said enclosure, control means engageable by the other end of said enclosure, said control means comprising plunger means actuated by the motion of said other end of the extensible enclosure, latch release means and pivotally mounted linkage means interconnecting said plunger means and said latch release means, guide means for said plunger means to insure substantially axial movement thereof, spring means in said housing compressed by said initial motion to eject said sealed unitary enclosure following release of said hook means, latch means maintaining said hook means in the missile retaining position, said latch means being released by said latch release means in response to initial motion of said extensible enclosure, and spring means urging said latch means to the hook means engaging position.

10. Apparatus for discharging a mass from a body comprising retaining hook means removably securing said mass adjacent to said body, ejection means abutting said mass and mounted in said body for forcefully ejecting said mass from said adjacent position, said ejection means comprising an open-ended housing, a cylindrical enclosure having one open end freely disposed within said housing and a closed end abutting said mass, a piston disposed within said cylindrical enclosure spaced from the closed end thereof, means in said enclosure limiting the movement of said piston therein and an explosive charge between said closed end and said piston, control means mounted in said body adjacent said cylindrical enclosure and operable by said piston, and compression spring means intermediate said piston and said housing whereby said control means is actuated by partial extension of said piston in said cylindrical enclosure and said compression spring means is compressed to cause said cylindrical enclosure to be deployed from said housing following deployment of said mass.

11. Apparatus for forcefully discharging a mass from a body wherein the mass is supported adjacent the body by a plurality of rotatable hook means, said apparatus comprising an open-ended housing mounted in said body, a cylindrical enclosure having one open end freely disposed within said housing and a closed end abutting said mass, a piston disposed within said cylindrical enclosure spaced from said closed end thereof and operatively connected to said hook means, means in said enclosure limiting the movement of said piston therein, an explosive charge between said closed end and said piston, and compression spring means intermediate said piston and said housing whereby ignition of said explosive charge effects movement of said piston and compression of said spring, partial initial movement of said piston effecting movement of such hook means to release said mass.

References Cited in the file of this patent

UNITED STATES PATENTS

| | | | |
|---|---|---|---|
| 1,550,662 | Lesh | Aug. 18, | 1925 |
| 2,421,807 | Richey et al. | June 10, | 1947 |
| 2,466,980 | Bronson | Apr. 12, | 1949 |
| 2,699,908 | Fletcher | Jan. 18, | 1955 |
| 2,726,576 | Musser | Dec. 13, | 1955 |
| 2,736,522 | Wilson | Feb. 28, | 1956 |
| 2,749,063 | Low | June 5, | 1956 |
| 2,789,468 | Burns | Apr. 23, | 1957 |